(12) United States Patent
Malitzki

(10) Patent No.: US 6,595,351 B2
(45) Date of Patent: Jul. 22, 2003

(54) PUSHER FOR SCRAPER CHAIN CONVEYORS, ESPECIALLY FOR UNDERGROUND MINING

(75) Inventor: Hans-Jürgen Malitzki, Castrop-Rauxel (DE)

(73) Assignee: K. B. P. Kettenwerk Becker-Prunte (DE)

( * ) Notice: Subject to any disclaimer, the term of this patent is extended or adjusted under 35 U.S.C. 154(b) by 0 days.

(21) Appl. No.: 09/931,266

(22) Filed: Aug. 16, 2001

(65) Prior Publication Data
US 2002/0050442 A1 May 2, 2002

(30) Foreign Application Priority Data
Aug. 17, 2000 (DE) .................................. 100 40 186

(51) Int. Cl.[7] .............................................. B65G 19/24
(52) U.S. Cl. ..................................... 198/731; 198/728
(58) Field of Search ............................... 198/728, 729, 198/730, 731

(56) References Cited

U.S. PATENT DOCUMENTS

| 4,265,359 A | | 5/1981 | Temme ........................... 19/24 |
| 4,383,603 A | * | 5/1983 | Niemoller et al. ........... 198/731 |
| 4,722,434 A | * | 2/1988 | Millington .................... 198/731 |
| 5,249,664 A | * | 10/1993 | Steinkuhl ..................... 198/731 |

FOREIGN PATENT DOCUMENTS

| DE | 2224322 | * | 11/1973 | .................. 198/731 |
| DE | 2717449 | | 11/1978 | |
| DE | 2160027 | * | 7/1979 | .................. 198/731 |
| DE | 2807883 | | 8/1979 | |
| DE | 2905756 | | 8/1980 | |
| DE | 3307119 | | 9/1984 | |
| DE | 3504877 | * | 8/1986 | .................. 198/731 |
| DE | 19607263 | | 8/1997 | |
| DE | 29709717 | | 9/1997 | |
| EP | 270702 | * | 6/1988 | .................. 198/731 |

OTHER PUBLICATIONS

Descriptions of DE 29 05 756 CA, DE 33 07 119 A1, DE 29 70 9717 U1 and DE 196 07 263 A1.

* cited by examiner

Primary Examiner—James R. Bidwell
(74) Attorney, Agent, or Firm—Ostrolenk, Faber, Gerb & Soffen, LLP

(57) ABSTRACT

A scraper chain conveyor has pushing members with an upper and lower part shaped to prevent relative lateral movement in the direction of travel. The members are complementary shaped, with recesses and cooperating protrusions on either part, respectively. The parts have grooves to avoid conveyor protrusions that contribute to part wear and cooperating chain beds that retain a chain link when coupled together. Spaces between the coupled parts permit a pretensioning force applied to the coupled parts. The upper part bridges the lower part to improve the stability of the part coupling. The parts include wear indicators and can relieve strain introduced on the chain conveyor from larger drive sprockets.

16 Claims, 5 Drawing Sheets

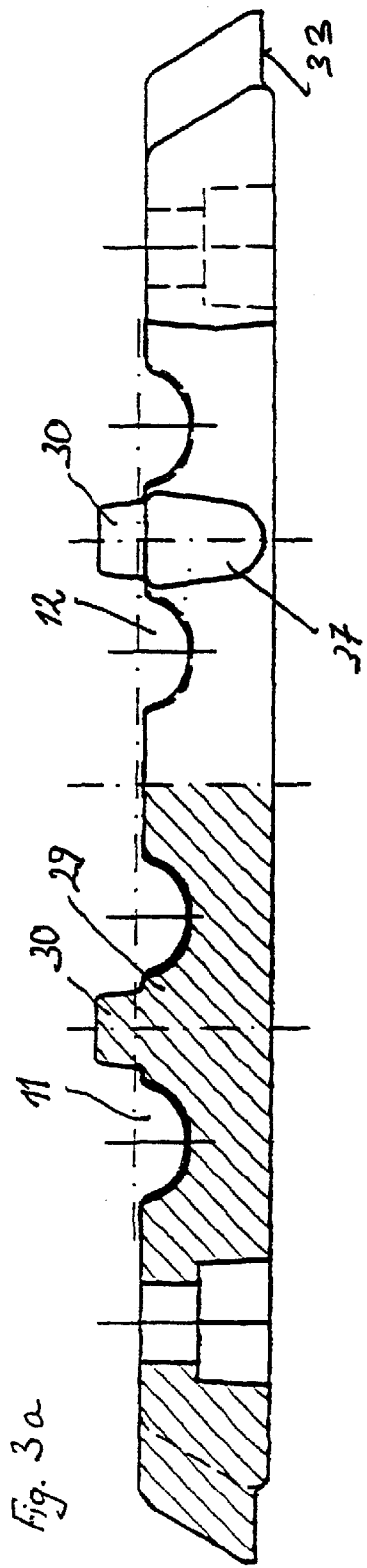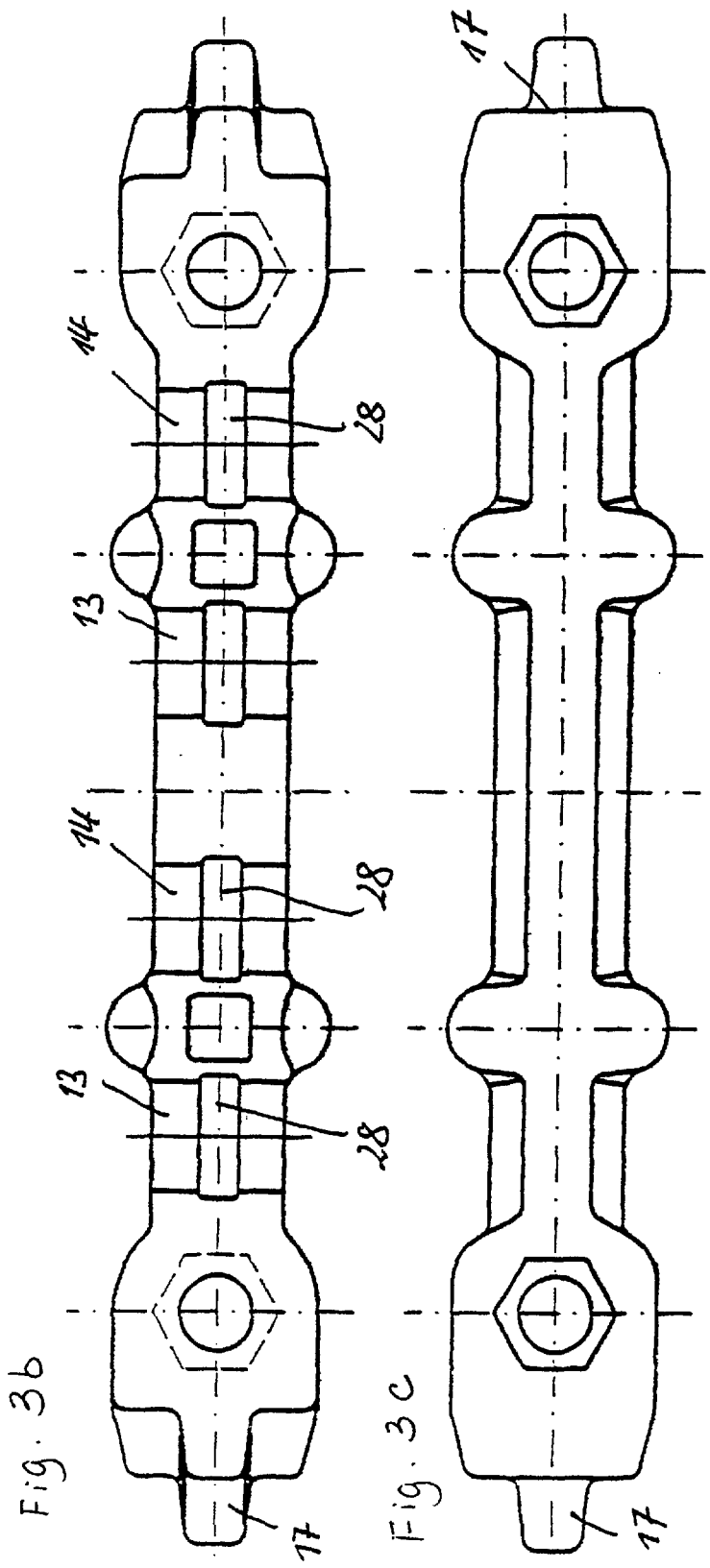

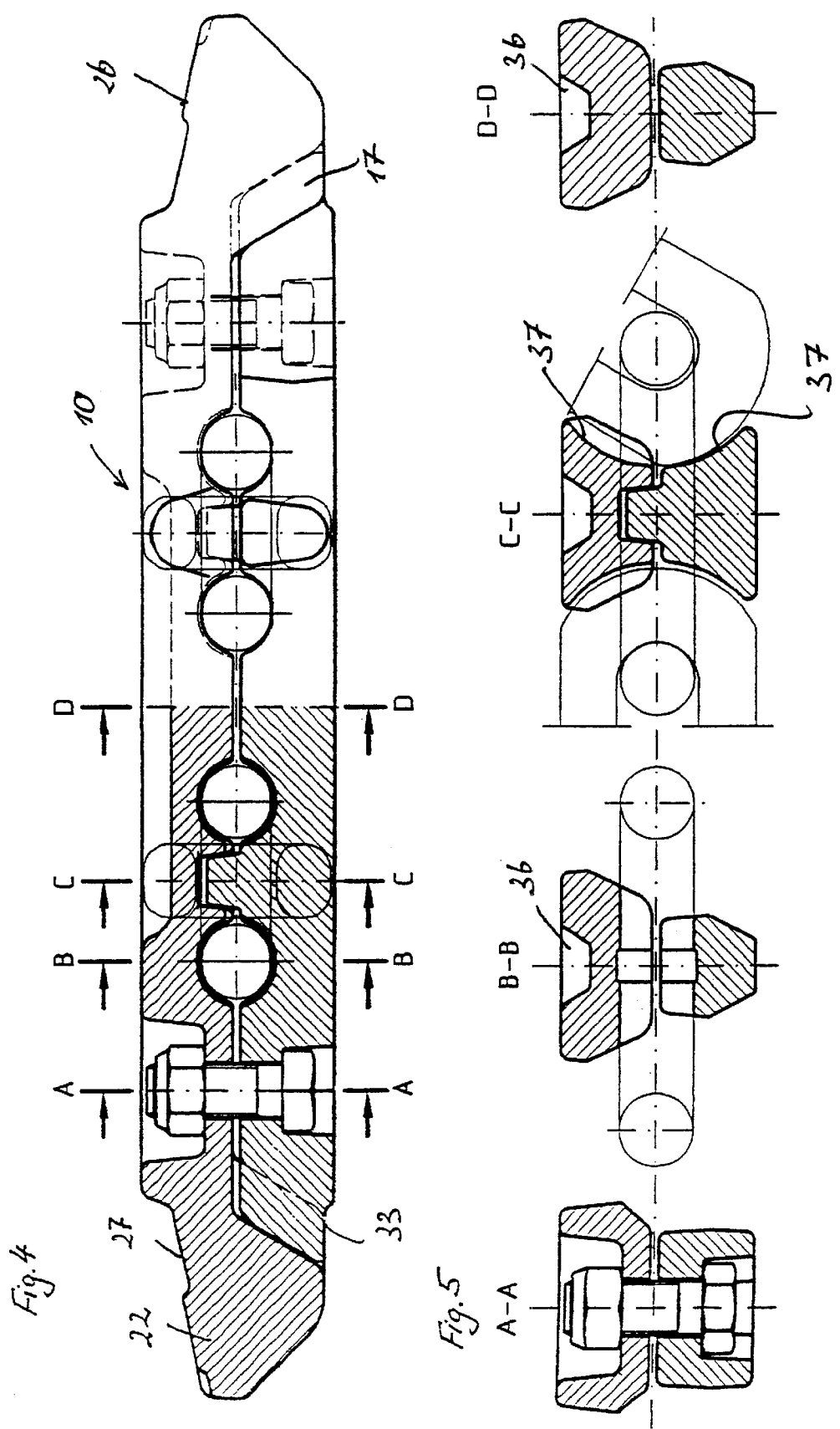

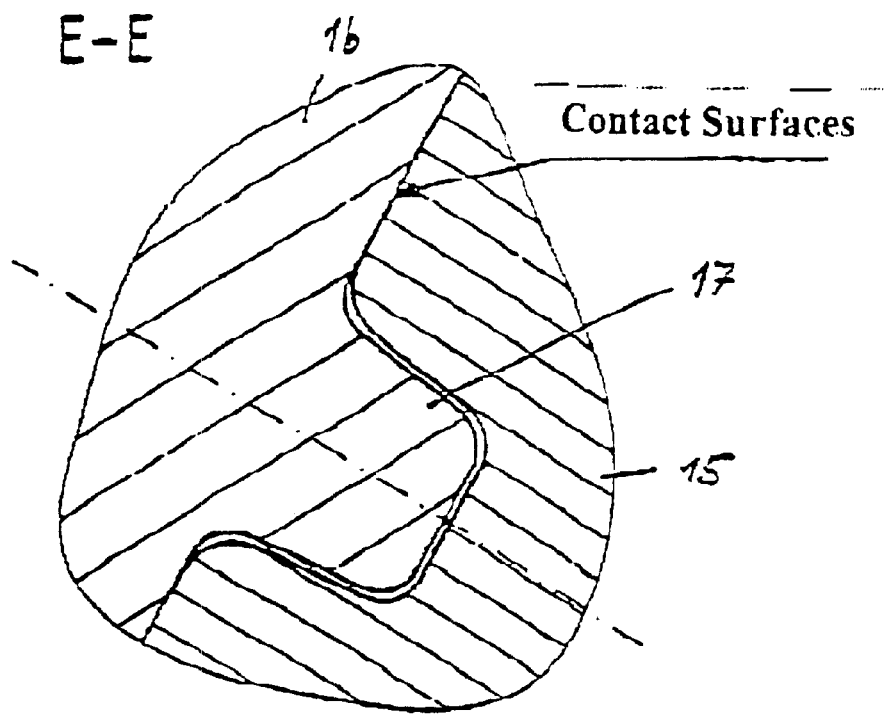
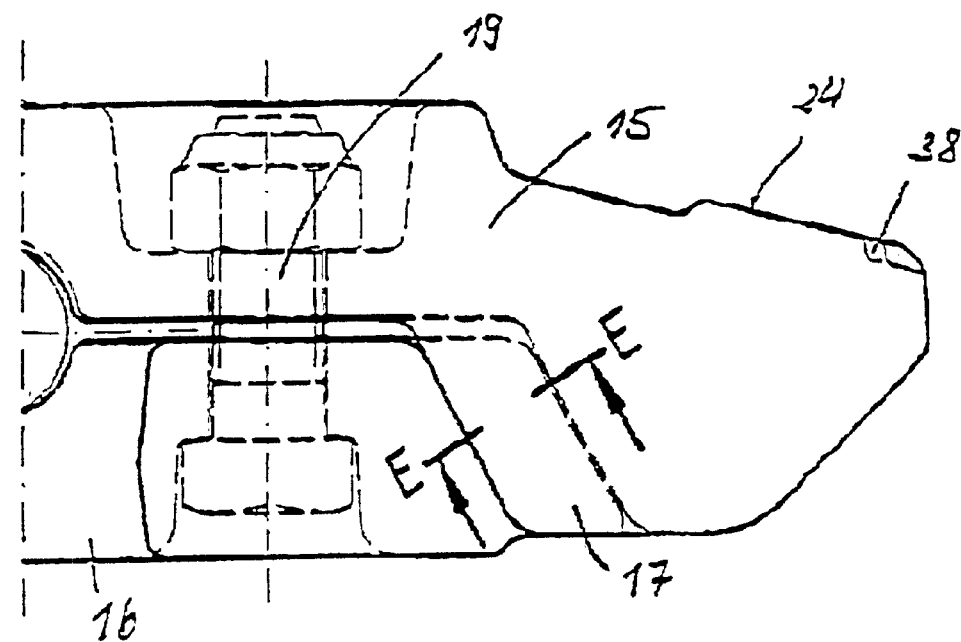
Fig. 6

PUSHER FOR SCRAPER CHAIN CONVEYORS, ESPECIALLY FOR UNDERGROUND MINING

BACKGROUND OF THE INVENTION

The invention relates to a pusher for scraper chain conveyors, especially of the kind used in underground mining. In particular, the present invention relates to a pusher with a bridge element that wraps over a lower portion of a scraper chain conveyor.

Pushers of this type used in underground mining usually comprise two parts, an upper and a lower part which are bolted together. The two parts secured firmly in place, anchor chain strands located within the jointing plane between the upper and lower parts of the pusher. For this purpose, each pusher is provided with chain beds for the chain links.

Pushers of this kind are known, for example, from the German patent application DE-A-27 17 449. The jointing plane between the upper and lower parts is configured such that the two ends of the lower part act as guide members. These two ends also engage the lateral guide profiles of the trough conveyor, while coupled to the upper part. This pusher design has become standard over the course of time because it offers enhanced wear resistance.

Although these pushers have by all means proved worthwhile in practice, the introduction of high forces—for example as a consequence of strain introduced within the guide profiles—can cause them to bulge and distort, and, in particular, can cause the bolts to shear off and the upper part of the pusher to be severed off. This problem occurs most frequently after the chain exits large-diameter sprocket wheels of a kind commonly used. In this configuration, the chain strands with the scrapers mounted on them are diverted along a curved path by guide beads arranged in the conveyor frame. The curved path is used to permit the chain to bridge the difference between sprocket wheel and conveyor trough. The chains are guided downwards at a steep angle until they slide into the trough profile, with the scrapers taking up the necessary pressing force through end elements.

SUMMARY OF THE INVENTION

The object of the present invention is to overcome the drawbacks of the prior art, in particular by designing a pusher that is stable even when there is operating constraints. It is a further object that the pusher assembly be easily installed and maintained.

This object is established according to the invention by the features contained in the characterising part of claim 1, useful developments being characterised by the features contained in the subclaims.

According to the invention, the upper part of the pusher is designed as a bow-like bridge element, the ends of which wrap over the two ends of the lower part from above and confine the lower part in a clasp-like manner. In cases of strain on the pushers within the lateral guide profiles of the trough conveyor, which occurs especially during the transition from sprocket wheel to conveyor trough, the forces generated are introduced predominantly in the region of the wrap-over ends. However, because the ends of the upper part embrace the lower part in a clasp-like manner, distortion of the upper and lower parts is prevented. This arrangement provides an advantage over the prior art because it avoids severing a pusher part. This design also considerably facilitates assembly, because the lower part, being of smaller width (transverse to the direction of transport) than the upper part, can very easily be pushed under the two chain strands when the pusher is being fitted. The bridge-like upper part is then simply mounted on top and bolted. If, in addition, as is expedient, the upper and lower parts are symmetric with respect to the transverse center line, i.e. the line perpendicular to the longitudinal direction of transport and axis/axes of the chain strand or strands, assembly becomes even easier because the pushers can also be fitted laterally transposed. When fitting the pushers, it is no longer necessary to differentiate between the front and rear ends of the pusher in terms of the direction of transport.

The lower part is preferably confined in clasp-like manner within the space delimited by the bridge-like upper part. This structure results in a stable joint between the upper and lower parts. In this connection, it is expedient to have a small space between the upper and lower parts in the area of the central jointing plane, because this permits desirable pretensioning between the upper and lower parts by means of the bolts. It is especially beneficial if this space is effected by way of the distal cuneiform contact surfaces—which run obliquely outwards from top to bottom—between the wrap-over ends of the upper part and the ends of the lower part.

It is furthermore of advantage to design the guide surfaces of the upper part so that the preferably cuneiform ends of the bridge-like upper part are guided within the lateral guide profiles of the trough conveyor. Most of the wear on the parts then occurs in the upper part, which is very easily removed for repair purposes and can be replaced by a repaired upper part.

By means of appropriate recesses in the area of the upper port guide surfaces, raised wear surfaces are obtained that can be repaired very easily by build-up welding or by welding on shells. A check for the occurrence of wear can be provided by wear marks—grooves, flutes or steps—in these upper wear surfaces. If the grooves, flutes or steps are no longer visible, the pusher can be considered worn to the extent that the need for maintenance to replace or repair the scraper is easily observed.

Again in the context of wear markings, the invention provides that each chain bed—formed by two axial chain conduits—features a peripheral, groove-like depression. These depressions serve simultaneously as wear marks and to accommodate the weld of the chain links. As a result, the chain links are accommodated with very little friction, in particular, both positively and non-positively in the pushers.

Another useful feature of the invention is that to reduce friction, the ends of the lower part are recessed, creating a free space which bridges the welds formed by welding the base plate to the lateral guide profiles of the trough conveyor. It is to advantage if the recessed surfaces are flush with the lower surface of the wrap-over ends of the upper part.

It is additionally expedient to provide a groove-like recess in the top surface of the upper part, the recess running transversely with respect to the direction of transport and preferably extending from the bridge centre to the proximity of the holes for the bolts. This measure not only saves material, but also gives the upper part an essentially T-shaped cross-section, as a result of which the moment of resistance in the direction of transport is increased.

Another feature permitting high stresses to be taken up in the direction of transport is the provision of centring noses or centring projections in the region of the ends of the lower part and the lands between chain conduits. These projections prevent conveying forces from causing displacement of the upper and lower parts.

BRIEF DESCRIPTION OF THE DRAWINGS

The above objects of the present invention are achieved in the preferred embodiments of the invention, described below with reference to the drawings in which:

FIGS. 3a, b, c respectively show side cross-section, top and bottom views of the lower part of a pusher.

FIG. 4 shows a partly sectional lateral view of a pusher, with cutting planes indicated;

FIG. 5 shows several sections cut along the planes shown in FIG. 4; and

FIG. 6 shows a detailed view of the end of a pusher, and, in the upper part of the Figure, the sectional view E—E to show the contact surface between the upper and lower parts.

DETAILED DESCRIPTION OF THE PREFERRED EMBODIMENTS

Figure 1:
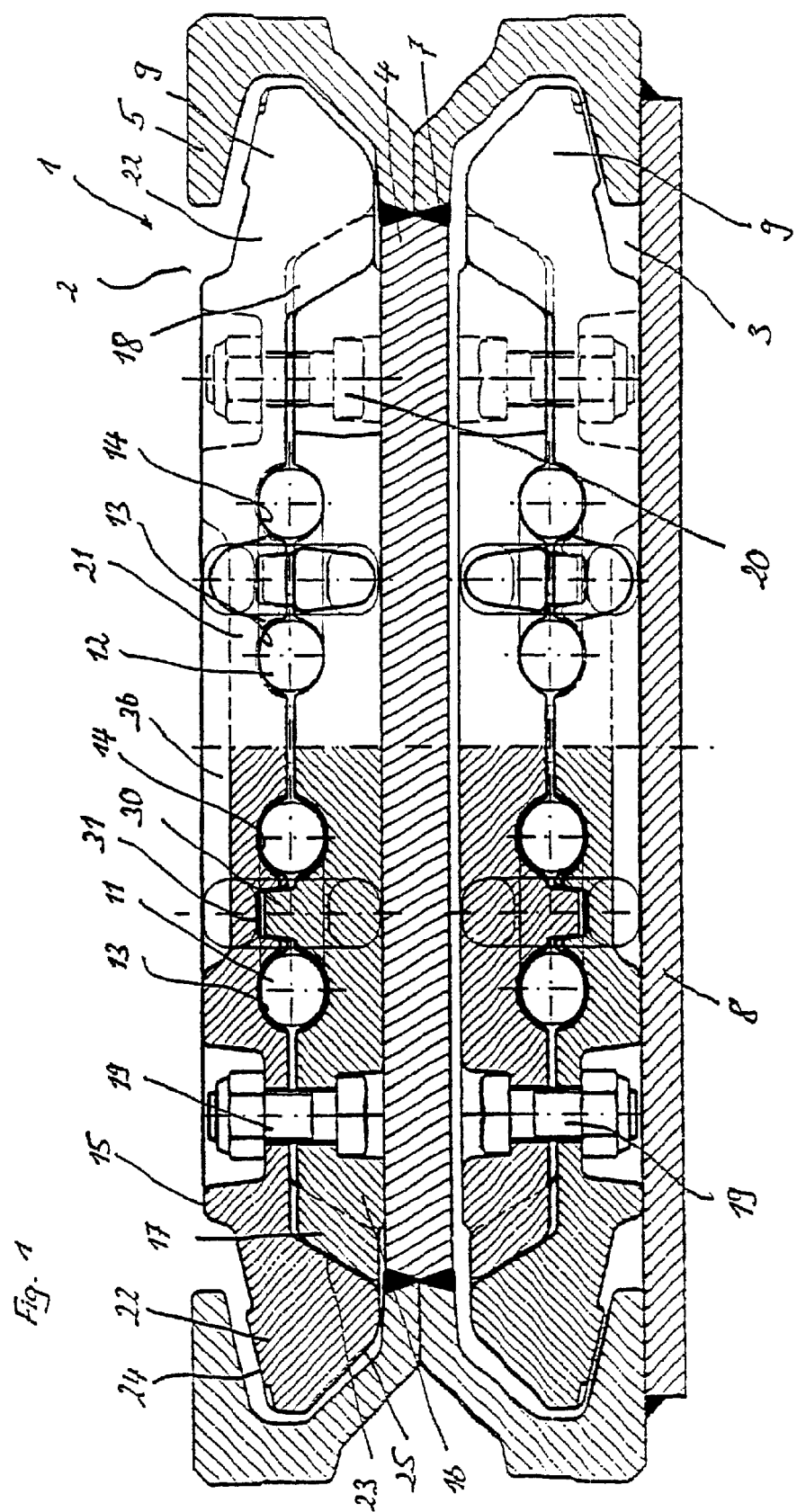
FIG. 1 shows a partly sectional view of a pusher in a trough of a continuous conveyor for underground mining, comprising an upper and a lower run.

A shown in FIG. 1, the stationary part 1 of a scraper chain conveyor for underground mining has an upper run 2 and a lower run 3. The two runs are separated by a base plate which is welded at each end to the upper and lower lateral guide profiles 5 and 6 of the trough conveyor to form welds 7. The lower run 3 is closed at the bottom by a covering plate 8 which, as again shown in the Figure, is welded on.

It can be seen that on the inside, the guide profiles 5 and 6 form a profile which encloses the ends 9 of the pushers, which are all identical and have the general reference numeral 10. To secure them in place, the pushers 10 are provided with two centrally located chains. Accordingly, each pusher has two chain beds 11, 12 to accommodate the two parallel chains. The chain beds, each of which serves to secure one horizontal chain link of a round link chain in position, are identical to each other. For this purpose, parallel chain conduits 13 and 14 are provided for each chain bed 11, 12. The rounded inner surface of the chain conduits have a slightly larger radius than do the round, horizontal steel chain links.

Each of the pushers, referred to generally by the reference numeral 10, is made up of an upper part 15 and a lower part 16. To this end, each pusher is divided along a horizontal plane, the ends of which, however, are angled downwards and outwards due to the special design of the upper part. At the contact surfaces, nose-like projections 17, 18 at the ends of the lower part positively engage complementary recesses in the opposing surface of the upper part, thus having a centring effect. This ensures optimum transmission of forces, and the larger contact surface area also reduces wear. An added advantage is that any displacement of the upper and lower parts of the pusher due to forces acting in the direction of transport is safely ruled out.

To secure the horizontal chain links in the chain beds 11 and 12 in position, and also the upper and lower parts 15 and 16, each pusher is provided with bolts 19, 20. The bolts are in each case located to the outside of the chain bed; in the embodiment shown they are located in particular between the chain bed and the corresponding end of the pusher. The bolts, which engage corresponding nuts, are of identical design in all the pushers 10.

The upper part 15 of each pusher 10 is designed as a bow-like bridge element and has a bar-like central part 21 extending transversely to the direction of transport. The extremities of central part 21 adjoin downwardly projecting, cuneiform ends 22, which wrap over the lower part 16. The lower part 16 is likewise designed as a linear, bar-like part with projections 17, 18 at end portions. The ends 22 of the upper part 15 wrap over the projections 17, 18 of the lower part from above and confine the projections 17, 18 between the ends 22 in a clasp-like manner. The contact surface between the upper and lower parts is an oblique surface 23 which extends outwardly from top to bottom.

If there is strain introduced within the lateral guide profiles, which occurs most frequently after the chain has been passed over a large-diameter sprocket wheel and is then guided steeply downwards before it enters into the guide profile of the trough conveyor, considerable forces are generated in the region of the pusher ends. These forces are introduced via the ends 22 of upper part 15, and are transmitted via the oblique contact surfaces 23 into the lower part 16. This causes the pusher to bulge outwards, which in conventional pushers causes the bolts to shear off, resulting in severing off of the upper part of the pusher. The damaged pushers must then be replaced by new ones. However, if the upper part 15 is of bridge-like design, and its two ends 22 embrace the two ends of lower part 16 from above, the pusher is prevented from bulging in this way. As a result, shearing off of the bolts and severing of the two parts of the pusher is effectively prevented. The accompanying stabilisation of the pushers in the critical areas also means that wear at the wear surfaces is significantly reduced. Thus increasing the pusher's service life.

The two ends 22 of the bridge-like upper part 15 are designed as pusher guide members. In consequence of their cuneiform shape, they have an upper guide surface 24 and a lower guide surface 25, which approach each other obliquely. As best seen from FIG. 2, which shows three different views of the upper part, namely a lateral view, a top view and a view from below, the guide surface 24 is raised at 26 as a wear surface. This is effected by providing recesses 27 at both ends. In the area of the wear surface 26, it is useful to provide an optical wear indicator in the form of a groove, a flute or a recessed surface 38, with which the wear at wear surface 26 and the material attrition between opposing end elements can be indicated. If this wear mark is no longer visible, the wear has progressed to a stage which could pose a danger, and the pusher must be exchanged and repaired.

Figure 2A:
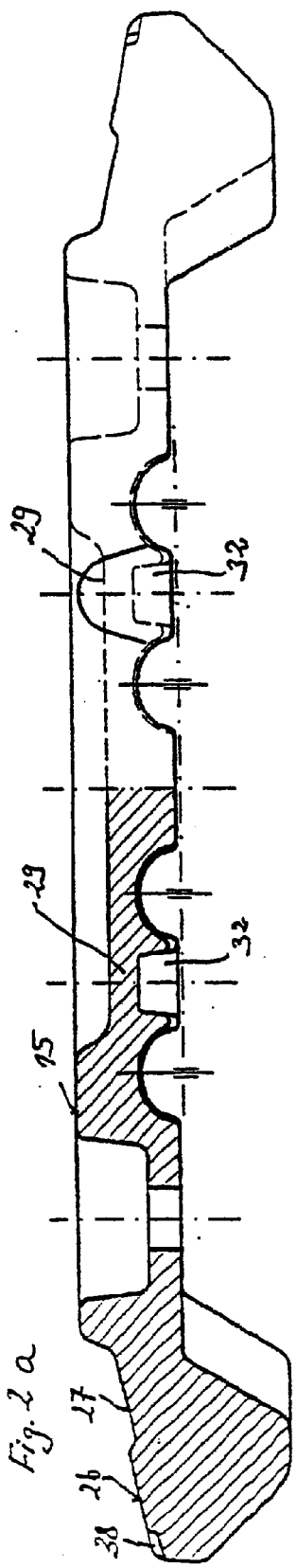
FIGS. 2a, b, and c respectively show side cross-section, top and bottom views of the upper part which has the form of a bridge.
Figure 2B:
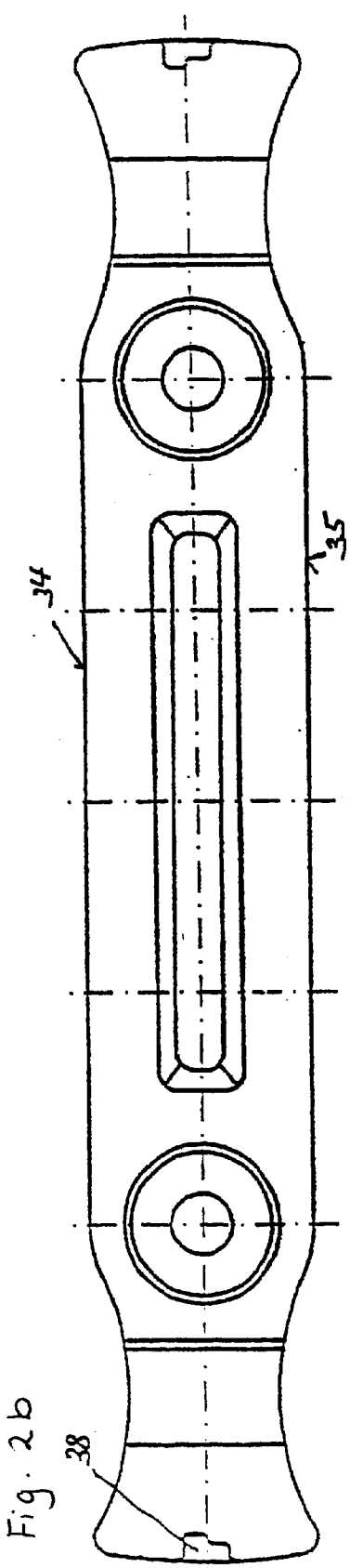
Figure 2C:
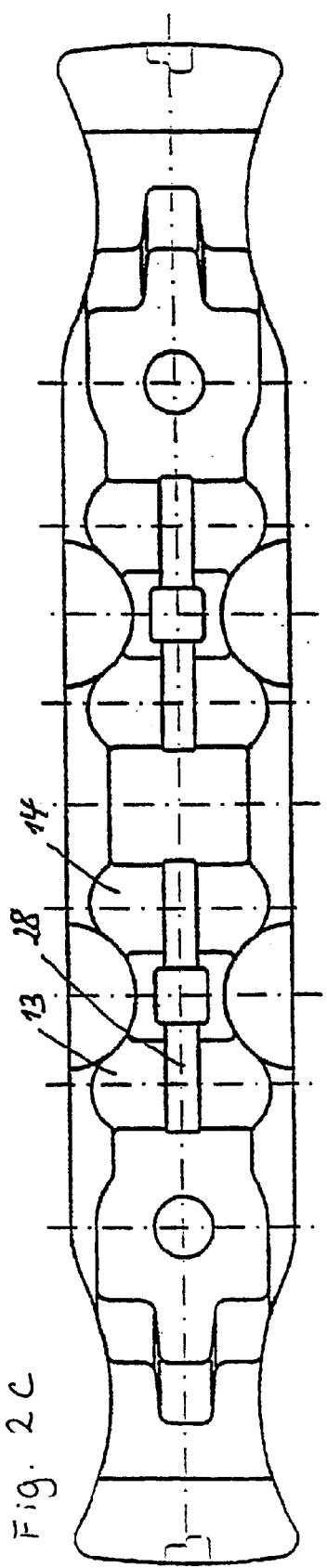

As best seen from FIG. 2 (bottom view) and FIG. 3 (middle view), which shows various aspects of the lower part 16, each chain bed or longitudinal chain conduit 13 and 14 features a transverse flute or groove 28, which again serves as a wear mark but also accommodates the weld of an O-shaped chain link in each case. This prevents vibrations and increases the service life of chain and pusher. The land 29 of each chain bed 11 and 12 in the lower part 16 has at the top a nose-like projection 30, which engages with a matching recess 31 in the corresponding land 29 of the upper part and acts as centring projection. This enhances the anchorage of the upper and lower parts, and together with the centring noses at the ends rules out any displacement of upper or lower part in the direction of transport. The interaction of the centring projection 30 and the recess 31 is also depicted clearly in FIG. 1.

As best seen from FIG. 3 the ends of the lower part 16 feature a recess 33, creating a free space between each end of the lower part 16 and the base plate 4 shown in FIG. 1. This means that the weld at 7 between the base plate 4 and the trough conveyor's lateral guide profiles 5,6 is effectively bridged, which again leads to a reduction in possible wear. As best seen in FIG. 1, the recessed surface 33 is flush with the ends 22 of the upper part 15.

FIGS. 2 and 3 also show that both the upper and the lower part are symmetric with respect to the transverse centre line, i.e. the line which runs perpendicular to the longitudinal direction of transport. This results in the formation of scraper edges 34 and 35 on each side, one of which acts in the transport direction and one in the reverse direction, and which, especially in the area of the lower run, scrape off material to be conveyed.

As shown at the top right of FIG. 3, an arched area 37 is provided towards the outside of the upper and lower parts at the level of each land 29. It serves as bearing surface for the vertical chain links, and prevents the chains from kinking after they pass over the sprocket wheel and are either slack or tensioned only very slightly.

With the design of the invention, distortions in the upper and lower parts are prevented even when there is pronounced strain with correspondingly high forces. With conventional pushers, distortions can lead to severing of the upper part from the lower part. The vertical bolted connection ensures that the chain is securely clamped in the pusher. As explained before, the holes for the bolts are located as far out from the centre as possible so as to avoid critical bending stresses in the middle of the chain bed. Because the upper and lower parts are designed with a space between them in the area of the bolted connections, there is an intended pretensioning reserve which prevents the nuts from loosening and considerably facilitates maintenance performed after the pusher has been used the first time. Scraper edges are ensured on both sides, so that the lower run is cleaned continuously by each pusher. Another useful feature of the invention is that the chains in the chain conduits are sufficiently long to prevent slippage of chain links—especially in closed trough profiles—behind the pusher, even in the case of narrow chains. Kinking of the chain behind the pusher is prevented thanks to the arched surfaces on the two outer sides of the upper and lower parts. It is beneficial to manufacture the pushers from high-grade steel, preferably 42 CrMo$_4$, because this will guarantee that the construction in question has a high degree of ductility, excellent bending strength, low susceptibility to cracking and optimum wear properties. The pusher design facilities build-up welding or the welding on of repair shells during corrective maintenance. The symmetrical design also facilitates fitting of the pushers, because it is no longer necessary to differentiate between the front and the rear of the part. On the contrary, the pushers can be fitted in either direction. Fitting of the pushers is facilitated still further by the fact that during fitting, the lower part can easily be pushed under the chain strands, and the bridge-like upper part then simply mounted on top. This makes it much easier to thread the pushers into the chain strands.

FIG. 5 shows various views illustrating the arched surface 37 in the upper and lower parts (section C—C of FIG. 4), which are shaped to conform with the rounded surfaces of the chain links and prevent the vertical chain links from kinking when the chain is not fully tensioned. The sectional view C—C also shows the centering connection between the upper and lower parts in the area of the central transverse axis. Section D—D shows how recess 36 imparts a T-profile to the bridge-like upper part, enhancing its strength and also the stability of the jointed pusher, so that severing of the two parts is prevented.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A pusher element for a scraper chain conveyor, comprising:

a bow-shaped upper part including two cuneiform ends and a downwardly facing surface, the downwardly facing surface including at least one downwardly facing recess, each of the cuneiform ends having upper and lower guide surfaces and an outwardly extending contact surface, the outwardly extending contact surface being provided with a contact recess, the upper and lower guide surfaces of each of the cuneiform ends sloping toward one another to guide the pusher element in a respective lateral guide profile of the scraper chain conveyor;

a lower part including two ends and an upwardly facing surface, the upwardly facing surface including at least one upwardly facing projection assigned to the downwardly facing recess of the upper part, each of the two ends of the lower part including an oblique contact surface provided with a nose-like projection; and an attachment arrangement configured to secure the upper part to the lower part in a clasp-like manner, such that the cuneiform ends of the upper part respectively wrap around the ends of the lower part, a jointing plane being formed between the upper and lower parts, the nose-like projections of the lower part engaging in the respective contact recesses of the contact surfaces of the upper part, the upwardly facing projection of the lower part engaging with the downwardly facing recess of the upper part, at least one chain bed being formed between the upper part and the lower part in an area of the upwardly facing projection of the lower part and the downwardly facing recess of the upper part.

2. The pusher element according to claim 1, wherein the upper part is provided with at least one opening and the lower part is provided with at least one opening assigned to and aligned with the opening of the upper part, the attachment arrangement including at least one bolt configured to engaged with the openings of the upper and lower parts to secure the upper part to the lower part.

3. The pusher element according to claim 2, further comprising bolt recesses in opposite surfaces of the upper and lower parts, bolt recesses permitting insertion of a cooperating bolt and a nut in the bolt recesses, whereby the bolt and nut in the recesses do not extend beyond the opposite surfaces, respectively, when the upper and lower parts are bolted together.

4. A pusher element according to claim 3, further comprising bolt recesses in opposite surfaces of the upper and lower parts, bolt recesses permitting insertion of a cooperating bolt and a nut in the bolt recesses, whereby the bolt and nut in the recesses do not extend beyond the opposite surfaces, respectively, when the upper and lower parts are bolted together.

5. A pusher element according to claim 4, wherein the bolt openings are between the chain bed portions and the first and second ends, respectively.

6. A scraper chain conveyor having a direction of extension and comprising a conveyor trough for pushers for the scraper chain conveyor and a plurality of the pushers of claim 1 arrayed in a row one after the other and a chain passing along the direction of extension and through each of the pushers on the conveyor;

the conveyor having lateral guide profiles which wrap around the first ends of the upper parts and guide the upper part of each of the pushers for movement along the conveyor.

7. A pusher element according to claim 1, wherein at least one of the guide surfaces of the upper part has a recess, and the recess defining a raised wear surface portion of the guide surface.

8. A pusher element to claim 1, comprising a wear indicator on at least one of the guide surfaces of the upper part.

9. A pusher element according to claim 8, wherein the wear indicator is selected from a group consisting of grooves, flutes and steps extending in the direction of extension of the conveyor.

10. A pusher element according to claim 1, wherein:

the chain beds include parallel conduits formed by grooves in the direction of extension of the conveyor.

11. A pusher element according to claim 1, which is symmetrical about a central axis along the conveyor of extension.

12. The conveyor according to claim 6, further comprising:

an upper and lower run of the conveyor for providing a conveying and return path for the conveyor, the chain and the pusher elements.

13. The conveyor according to claim 12, further comprising a covering plate enclosing the lower run and contacting the upper part along the lower run, whereby the upper part cleans the covering plate when the conveyor operates.

14. A pusher element according to claim 1, further comprising:

a space between the upper and lower parts near the at least one chain bed; and the space permitting said upper and lower parts to be coupled with an adjustable pretension force while positively clasping a chain link.

15. A conveyor according to claim 6, further comprising:

a recessed surface on a lower inner side of the second end portions of the inner parts;

a base plate below and between both inner parts forming a conveyor guide; and the recessed surface forms a gap between the lower parts and the base plate.

16. A pusher element according to claim 1, further comprising:

an elongated recess in a top surface of the upper part and extending transversely to motion of the conveyor;

the recess being substantially centered in relation to the ends of said upper part.

* * * * *